United States Patent Office 2,929,846
Patented Mar. 22, 1960

2,929,846

METHOD OF MAKING A FUNGICIDAL SUBSTANCE

Charles W. Gates and Harry D. Glenn, Naugatuck, Conn., assignors to United States Rubber Company, New York, N.Y., a corporation of New Jersey No Drawing. Application January 28, 1957
Serial No. 636,479

1 Claim. (Cl. 260—567)

This invention relates to a method of making a fungicidal substance, and more particularly it relates to an improved method of making a fungicidal substance believed to be a poly(ethylene bis thiuram sulfide), by the action of phosgene on nabam (i.e., disodium ethylene bis dithiocarbamate).

U.S. Patent 2,859,246 of Martin et al., issued November 4, 1958, discloses an improved fungicidal substance made by desulfurizing with sodium cyanide a poly(ethylene bis thiuram disulfide). It has been desired to provide a simpler and more economical method for producing this fungicide in good yield. We have now found, unexpectedly, that this fungicidal substance can be prepared more conveniently and efficiently by treating nabam (i.e., disodium ethylene bis dithiocarbamate) with phosgene. The reaction is suitably carried out under anhydrous conditions, preferably in a volatile organic solvent medium, such as benzene, n-hexane, chloroform, petroleum ether, ligroin, or the like. The reaction can also be carried out in an aqueous medium.

Broadly speaking, the invention may be described as a treatment of an alkylene bis dithiocarbamic acid. Such acid is obtainable by the action of carbon disulfide on an amine, especially a primary amine, and particularly a primary diamine such as ethylene diamine, 1,2-proplyene diamine, 1,3-propylene diamine, paraphenylene diamine, as well as compounds such as diethylene triamine, followed by neutralization of the reaction mixture with a base. More specifically, the invention typically utilizes such alkylene bis dithiocarbamic acids in the form of their metal salts, especially alkali metal salts, preferably the sodium salt, of which class disodium ethylene bis dithiocarbamate (nabam) is the most important member.

The invention contemplates the treatment of the nabam or the like, in water or in a volatile organic solvent liquid medium by introducing phosgene, conveniently in a liquid state, while stirring the reaction mixture and cooling the same, usually to a temperature within the range of from −10° C. to +20° C. The reaction may be conducted at atmospheric pressures, or under super-atmospheric pressure if desired. For each mole of nabam, we generally employ at least one mole of phosgene, and preferably a slight molar excess, say a 10 or 20% molar excess, of phosgene is preferred. The reaction is usually substantially advanced within a period of from 1 to 20 hours.

There is thus formed a substantially insoluble material which is filtered off or otherwise removed from the reaction medium. This is usually a dull, white compound (melting at about 112° C. with decomposition) which, upon standing, appears to split off carbon oxysulfide to form a light yellow fungicidal substance containing significantly less combined sulfur, which is the desired product. The product is stable at room temperature, but tends to decompose at increasing rates at temperatures above 60° C. Depending on the speed of heating, softening may occur at temperatures as low as 110° C., but frequently the product does not come to a complete melt below about 185° C., at which temperature it has usually decomposed. It is practically insoluble in water, and soluble with decomposition in pyridine and alkaline aqueous alcohol or acetone. It is partially soluble in acetone and other usual organic solvents. When it is in characteristic crystalline form it has the X-ray diffraction pattern shown in said Martin et al. U.S. Patent 2,859,245. Sometimes the product is amorphous.

The product is remarkable for its unusually powerful fungicidal activity. It is effective against an unusually wide variety of fungi on plant and animal tissues. Its value for agricultural applications has been amply demonstrated. It gives evidence of systemic activity.

The starting substance, nabam, is ordinarily in the form of a hydrate. For purposes of the present process the nabam may be first dehydrated, and since the anhydrous nabam is rapidly converted to the tetrahydrate on exposure to air, it is preferable to carry out the dehydration in situ in the reaction vessel, just before the phosgene is added. This is conveniently accomplished by providing an excess of the organic solvent, such as benzene, which is distilled off before the start of the reaction to remove the water azeotropically. The reaction is also facilitated by reducing the nabam to as small a particle size as possible.

The following example will serve to illustrate the practice of the invention in more detail.

*Example*

Nabam tetrahydrate was azeotropically distilled with benzene to prepare anhydrous nabam. Anhydrous nabam (52 parts; 0.2 mole) was added to 500 parts of dry benzene and the mixture was cooled to 60° C. with stirring. Liquid phosgene (22 parts; 0.22 mole) was added with stirring and the temperature of the reaction mixture was maintained at 7° C. for 8 hours. The resulting material was filtered and air dried. About 67 parts of material was obtained; this material was washed, while being stirred, with 400 parts of water to remove sodium chloride. The remaining solid was filtered and air dried. Approximately 36 parts of a dull, white (M.P. 112° C. with decomposition) was obtained. The solid was allowed to stand for 36 hours at room temperature. During at least a portion of this period, the solid split off carbon oxysulfide, to yield 23 parts (64% yield) of odorless, light yellow desired product. The product had an indefinite melting range, but softened and decomposed at about 132°–135° C. The product had the characteristic X-ray diffraction pattern shown in the previously mentioned Martin et al. U.S. Patent 2,859,245. A similar product was prepared in chloroform. A similar product prepared in ligroin (90° C.) was amorphous.

Evaporation of the liquid portion of the reaction medium yielded less than one part of a tar-like material.

The high fungicidal activity of the product made by the method of the invention was demonstrated by mixing 50 parts of such product with 3.5 parts of commercial wetting agents (2.5 parts "Triton X-120" and 1.0 part "Daxad 11"), and 46.5 parts of clay to make a wettable powder. This preparation was found to have an LD 95 of 40 parts per million when employed to control such fungi as tomato blight (*Alternaria solani*), *Pythium ultimum*, bean rust (*Uromyces phaseoli*), and Verticillium wilt (*Verticillium alboatrum*), when applied in accordance with usual practice in carefully controlled tests, as described in the above-mentioned copending applications. For example, the formulation may be agitated in water to form an aqueous suspension which is sprayed on tomato plants.

The chemical, physical, and biological properties of the product are set forth in more detail in the Martin et al. U.S. Patent 2,859,245 referred to.

Having thus described our invention, what we claim and desire to protect by Letters Patent is:

A method of making a fungicidal substance comprising mixing disodium ethylene bis dithiocarbamate in a volatile organic liquid medium with phosgene, in molar proportions of from 1 to 1.2 moles of phosgene for each mole of disodium ethylene bis dithiocarbamate, at a temperature of from −10° to +20° C., for a period of from 1 to 20 hours, and separating from the said liquid medium a resulting solid material, the said separated solid material thereafter evolving carbon oxysulfide spontaneously to yield a yellow fungicidal product.

References Cited in the file of this patent

UNITED STATES PATENTS 2,048,043   Williams et al. _____ July 21, 1936

FOREIGN PATENTS 519,445   Germany _____ Mar. 11, 1931

OTHER REFERENCES

Thorn et al.: vol. 49 Chem. Abst., 10318 (1955).